United States Patent [19]

Holt

[11] 4,187,760

[45] Feb. 12, 1980

[54] INFLIGHT, STORES, FORCES AND MOMENTS MEASURING DEVICE

[75] Inventor: Lloyd J. Holt, China Lake, Calif.

[73] Assignee: The United States of America as represented by the Secretary of the Navy, Washington, D.C.

[21] Appl. No.: 943,885

[22] Filed: Sep. 19, 1978

[51] Int. Cl.² .................... B64D 1/04; F41F 5/02
[52] U.S. Cl. ............................. 89/1.5 E; 244/137 R
[58] Field of Search .............. 89/1.5 F, 1.5 G, 1.5 E, 89/1.5 R; 244/137 R; 294/83 AE, 83 R; 60/632

[56] References Cited

U.S. PATENT DOCUMENTS

| | | | |
|---|---|---|---|
| 2,822,207 | 2/1958 | Steinmetz et al. | 294/83 A |
| 2,889,746 | 6/1959 | Glassman et al. | 89/1.5 F |
| 2,937,899 | 5/1960 | Murphy | 294/83 R |
| 2,953,064 | 9/1960 | Glassman et al. | 89/1.5 F |
| 3,098,411 | 7/1963 | Fry | 89/41 |
| 3,121,369 | 2/1964 | Reeves | 89/1.7 |
| 3,427,437 | 2/1969 | Tye | 89/1.5 E |
| 3,557,550 | 1/1971 | Legarra | 60/26.1 |
| 3,610,094 | 10/1971 | Craigie | 89/1.5 F |
| 3,623,398 | 11/1971 | Meier et al. | 89/1.5 R |
| 3,974,990 | 8/1976 | Holt et al. | 244/137 R |

*Primary Examiner*—David H. Brown
*Attorney, Agent, or Firm*—R. S. Sciascia; W. Thom Skeer

[57] ABSTRACT

A measuring device for measuring the inflight forces and moments on a store carried by an aircraft wherein a dynamic pressure sensing device is incorporated in a stores suspension member so that a true constant indication of plus or minus forces and moments on the store can be inputted to an on-board aircraft computer for use in controlling the force required to eject the store from the aircraft.

10 Claims, 3 Drawing Figures

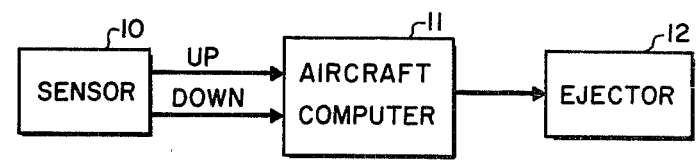
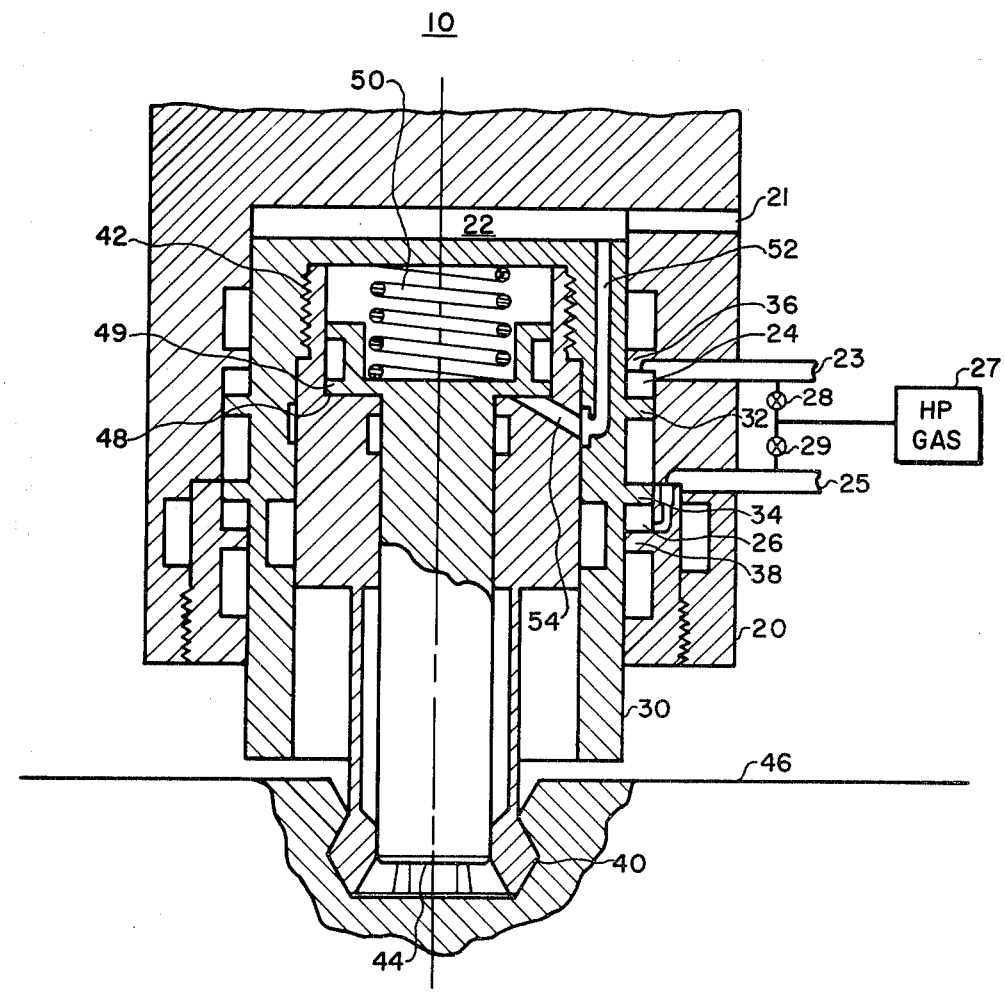

INFLIGHT, STORES, FORCES AND MOMENTS MEASURING DEVICE

BACKGROUND OF THE INVENTION

1. Field of the Invention

The present invention is intended for use with ejectors for ejecting stores such as missiles, bombs and the like from an aircraft and particularly to a system wherein it is desired that such stores be ejected in a controlled manner. This will not only preclude collision of the stores with the aircraft but also will optimize the delivery attitude.

The problem with present ejection systems is that the dynamic flow field, i.e., the aerodynamic induced moments caused by the flow field about the aircraft, cannot be sensed and compensated for in flight. Therefore, the weapon or store attitude at the end of the ejection stroke is not predictable. For instance, the dynamic loading due to flow field around the weapon or store will be completely different when the aircraft is in a dive as distinguished from engaging in a loft maneuver. In one case there will be negative "g"'s on the weapon and in the other case positive "g"'s.

2. Description of the Prior Art

Some prior art devices such as those illustrated in U.S. Pat. Nos. 2,937,899 and 3,610,094 predicted the store separation force necessary beforehand and built a static control into the system. However, in neither case were the dynamic forces calculated nor utilized in controlling the stores ejection forces.

In another system, illustrated in U.S. Pat. No. 3,974,990, the separation forces were again predetermined and inputted into the onboard aircraft computer. During ejection the gas pressure available for ejection was sensed, fed back to the computer and as soon as the theoretical ejection force matched the actual ejection pressure available store separation was accomplished. However, again this system did not take into account dynamic loading during flight conditions.

SUMMARY OF THE INVENTION

The present invention is a measuring device for measuring the inflight dynamic forces and moments on a store carried by an aircraft wherein a sensing device is incorporated into the stores attaching member which fixes the store on the rack of the aircraft. In one embodiment, hydraulic fluid acts as a spring scale to measure inflight forces and moments acting upon the stores carried by the aircraft. In another embodiment, a piezoelectric member senses changes in forces and moments on the store carried by the aircraft. A computer on board the aircraft is then utilized to calculate the ejection force required to eject the store to correct escape velocity for safe aircraft/store separation based on the inputs from either the hydraulic spring scale or the piezoelectric force sensing member.

BRIEF DESCRIPTION OF THE DRAWINGS

FIG. 1 is a simplified block diagram of the overall system;

FIG. 2 is a cross section through one embodiment of the invention; and

FIG. 1 is a very simple diagram illustrating the overall invention and includes a sensor 10 having up and down outputs which are inputted to a computer 11 on board the stores carrying aircraft. The computer 11 then outputs a signal to an ejector mechanism 12 which controls the amount of force to cause separation of the store from a rack carried by the aircraft. Sensor 10 would be adapted for use in an ejector stores control system such as that set forth in U.S. Pat. No. 3,974,990 wherein the sensor would be incorporated in the coupling 52 thereof. Also, coupling 52 could be integral with a stores carrying rack such as utilized on more modern aircraft and specifically such a rack as set forth in copending U.S. patent application Variable Force Control System for Weapon Ejection Mechanisms, Ser. No. 943,886, filed Sept. 19, 1978.

Figure 3:
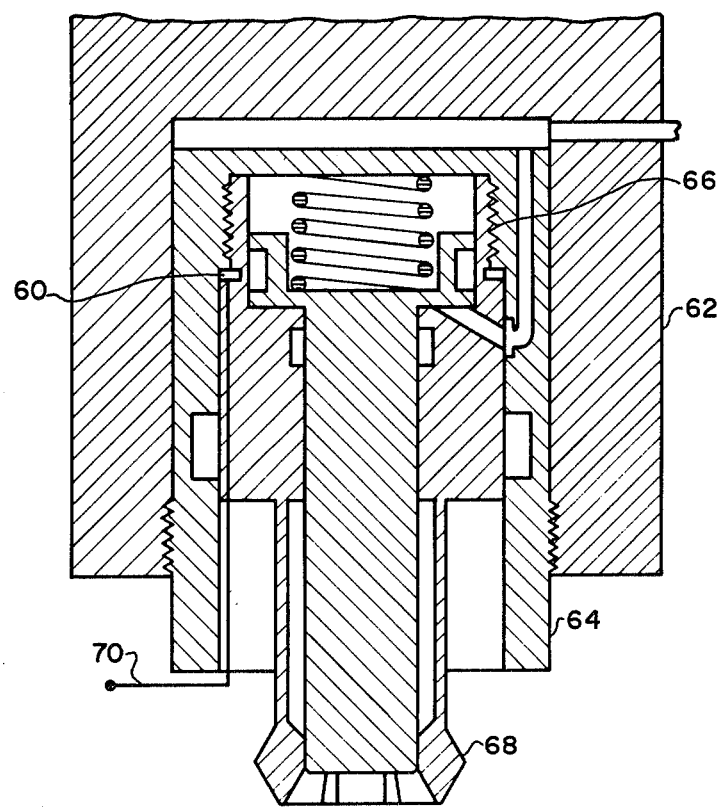
FIG. 3 is a cross section through another embodiment of the present invention.

In one embodiment of the invention illustrated in FIG. 2, hydraulic fluid acts as a spring scale to measure inflight forces and moments acting upon the store carried by the aircraft in flight. In this embodiment, the sensor 10 comprises an open-ended member 20 in the form of a stepped cylinder closed at one end. A latch release port 21 communicates with an internal portion 22 near the closed end of the member 20 and an upload sensing port 23 is in communication through the housing 20 with an upload sensing chamber 24. A download sensing port 25 is in communication through the wall of the housing 20 with a download sensing chamber 26 as well. Connected between the ports 23 and 25 by respective valves 28 and 29 is a source of high pressure gas 27. A load sensing sleeve 30 having a hollow interior and a closed end is carried internally of outer housing 20 and acts as a free floating piston due to the interaction of flanges 32 and 34 on sleeve 30 interacting with the inner wall of the respective shoulders 36 and 38 on member 20. The inwardly protruding shoulders 36 and 38 which cooperate with outwardly protruding shoulders 32 and 34 respectively on the load sensing sleeve 30 define the upper load sensing chamber 24 and lower load sensing chamber 26 respectively.

A collet latch 40 is threaded into the hollow interior of the load sensing sleeve 30 as at 42. The collet latch 40 is also hollow and carries a latch piston 44 internally thereof. The collet latch 40 is adapted to engage and maintain the store 46 on the aircraft rack. Collet latch 40 is formed with an upper shoulder as at 48 and the latch piston 44 has a shoulder 49 thereon which engages shoulder 48 under influence of a spring 50 which acts between the closed end of load sensing sleeve 30 and the upper-most surface of latch piston 44.

Latch release port 21 fluidly communicates by means of a passage way 52 in the load sensing sleeve 30 and a passageway 54 in the collet latch 40 with the surface of the latch piston 44 which abutts shoulder 48.

The embodiment of FIG. 3 is exactly like that of FIG. 2 except that the hydraulic spring mechanism has been replaced by washer 60 which incorporates a piezoelectric material capable of measuring strain. Again, there is an open-ended member 62 which is formed in the shape of a cylinder closed at one end. Threadably secured within the open portion of the member 62 is a load sensing sleeve 64 which is also formed in the shape of a cylinder closed at one end. The load sensing sleeve is again threaded at the upper portion as at 66 and a collet latch 68 having enterior threads thereon at one end is threaded thereinto.

However, in this embodiment, the load sensing washer 60 is inserted between cooperating shoulders on the collet latch 68 and the load sensing sleeve 64 as shown. Conducting members 70 attached to the sensing washer 60 are brought out appropriately for inputting a signal to the onboard aircraft computer.

In the operation of the embodiment of FIG. 2, when a store is loaded before a mission, download sensing chamber 26 is relieved of pressure and the upload sensing chamber 24 is filled by means of the high pressure gas source 27 acting through valve 28. Then, fluid pressure is applied to the download sensing chamber 26 through the high pressure gas source 27 acting through valve 29 to raise the load sensing sleeve 30 approximately 3/16 inch. Both load sensing ports are then isolated from the high pressure gas source 27 by means of the valves 28 and 29 so that they are then connected only to respective load sensors not shown, which are conventional. The load sensors provide appropriate information to the onboard weapons computer regarding the flow field forces at the latch stations during aircraft flight.

In the embodiment of FIG. 2, the hydraulic fluid in the upload sensing chamber 24 and download sensing chamber 26 is supporting the store suspension mechanism in the vertical plane on both the positive and neagative "g" sides. The upload and download sensing chambers 24 and 26 are pre-pressured and sealed. The pressure transducers, not shown, associated with sensing ports 23 and 25 then produce electrical analogs of changes in chamber pressure. The up and down signals are inputted to the on board computer 11 and converted thereby in the armament management system, knowing the weapon and the force required to eject the weapon, to ejection force requirements. The proper signals are then given the ejection system associated therewith so that the power available may be varied according to the specific set of dynamic conditions present at any given time.

The embodiment of FIG. 3 would operate essentially the same as that of FIG. 2 except that before the weapon or store is attached to the collet latch 68, the collet latch is threadably inserted into the load sensing sleeve 64 and the load sensing washer 60 is pre-stressed thereby until a predetermined output reading is achieved, for instance, 10,000 psi. The weapon is then attached and held by the collet latch. Inflight dynamic forces acting on the store and thereby through the collet latch 68 will cause the pressure sensing washer 60 to output signals corresponding to changes in the dynamic loading on the store.

Again, these signals will be outputted through conductor 70 to the on board aircraft computer wherein the correct ejection forces will be calculated and the actual ejectors 12 will be controlled such that that the correct ejection force is applied during the ejection stroke.

Inflight aircraft flow field forces and moments can be measured in real time throughout the full combat maneuvering envelope of an aircraft. Measurements may be made of a single flight on any single store or in combination with the entire weapons mix.

It is to be understood that the pressure sensors of the present invention might be used with any system such as a fluid, gas or mechanical system to vary the ejection force thereof.

What is claimed is:

1. A measuring device for measuring the inflight forces and moments on a store carried by an aircraft comprising:
    a mounting member
    latch means for engagement with said store and configured to restrain the store against relative movement therebetween and for transmissions of loading stress therealong, said latch means being effectively connected to, and carried by said mounting member;
    and pressure sensing means positioned between said mounting member and said latch means for sensing inflight forces on said store.

2. A measuring device as set forth in claim 1 wherein:
    said mounting member comprises an open-ended cylindrical member;
    and wherein said latch means includes a piston-like end configuration which fits within said open-ended cylindrical member.

3. A measuring device as set forth in claim 2 wherein said pressure sensing means includes:
    an interface between said open-ended cylindrical member and said latch means which is configured to provide an upload sensing chamber and a download sensing chamber;
    said upload and download sensing chambers being initially pressurized to provide a baseline pressure.

4. A measuring device as set forth in claim 3 wherein:
    the upload sensing chamber and download sensing chamber are connected to sensing ports for transferring the changes in pressure thereto.

5. A measuring device as set forth in claim 1 wherein:
    said latch means includes a radially extending portion which is configured to engage a store.

6. A measuring device as set forth in claim 5 wherein:
    said extending portion comprises a hollow collet.

7. A measuring device as set forth in claim 6 and further including:
    unlatching means including a latch piston carried internally of said collet and mounted to move axially relative thereto for releasing said collet from an engaged store.

8. A measuring device for measuring the inflight forces and moments on a store carried by an aircraft comprising:
    an open-ended cylindrical member;
    a cylindrical load sensing sleeve carried internally of said cylindrical member;
    a weapon restraining member carried internally of said load sensing sleeve and configured to restrain the store against relative movement with respect to said restraining member;
    and pressure sensing means located between said open-ended cylindrical member and said load sensing sleeve for responding to inflight forces on said store as transmitted by said sleeve.

9. A measuring device as set forth in claim 8 wherein; said pressure sensing means is hydraulic.

10. A measuring device as set forth in claim 8 wherein; sensing means is a piezoelectric.

* * * * *